(12) United States Patent
Kim

(10) Patent No.: US 8,574,112 B2
(45) Date of Patent: Nov. 5, 2013

(54) GEAR TRAIN OF AUTOMATIC TRANSMISSION FOR VEHICLES

(75) Inventor: Woo-Yeol Kim, Gunpo (KR)

(73) Assignee: Hyundai Motor Company, Seoul (KR)

( * ) Notice: Subject to any disclaimer, the term of this patent is extended or adjusted under 35 U.S.C. 154(b) by 443 days.

(21) Appl. No.: 12/946,195

(22) Filed: Nov. 15, 2010

(65) Prior Publication Data

US 2011/0245017 A1   Oct. 6, 2011

(30) Foreign Application Priority Data

Mar. 31, 2010  (KR) .................. 10-2010-0029445

(51) Int. Cl.
*F16H 3/62* (2006.01)
(52) U.S. Cl.
USPC .......................................... 475/275; 475/279

(58) Field of Classification Search
None
See application file for complete search history.

(56) References Cited

U.S. PATENT DOCUMENTS 7,854,678 B2 * 12/2010 Kim ............................ 475/276

* cited by examiner

*Primary Examiner* — Erin D Bishop
(74) *Attorney, Agent, or Firm* — Morgan, Lewis & Bockius LLP

(57) ABSTRACT

A gear train of an automatic transmission for vehicles realizes at least eight forward speeds and two reverse speeds by combining three simple planetary gear sets with four clutches and two brakes. In addition, two friction elements are operated at each shift-speed. Therefore, the gear train has advantages of simplifying structures of the automatic transmission and improving power delivery performance and fuel economy.

16 Claims, 4 Drawing Sheets

FIG.2

| | C1 | C2 | C3 | C4 | B1 | B2 | F1 | gear ratio |
|---|---|---|---|---|---|---|---|---|
| D1 | ● | | | | ○ | | ● | 4.633 |
| D2 | ● | | | | | ● | | 2.774 |
| D3 | ● | ● | | | | | | 1.796 |
| D4 | ● | | ● | | | | | 1.403 |
| D5 | ● | | | ● | | | | 1.208 |
| D6 | | | ● | ● | | | | 1.000 |
| D7 | | ● | | ● | | | | 0.811 |
| D8 | | | | ● | | ● | | 0.655 |
| REV1 | | ● | | | ● | | | -3.413 |
| REV2 | | | ● | | ● | | | -1.900 |

○ : operated at coast

GEAR TRAIN OF AUTOMATIC TRANSMISSION FOR VEHICLES

CROSS-REFERENCE TO RELATED APPLICATION

The present application claims priority to Korean Patent Application No. 10-2010-0029445 filed in the Korean Intellectual Property Office on Mar. 31, 2010, the entire contents of which is incorporated herein for all purposes by this reference.

BACKGROUND OF THE INVENTION

1. Field of the Invention

The present invention relates to a gear train of an automatic transmission for vehicles which realizes at least eight forward speeds and two reverse speeds by combining three simple planetary gear sets with four clutches and two brakes.

2. Description of Related Art

A typical shift mechanism of an automatic transmission utilizes a combination of a plurality of planetary gear sets. A gear train of such an automatic transmission that includes the plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for vehicles having advantages of simplifying structures of the automatic transmission and improving power delivery performance and fuel economy as a consequence of realizing at least eight forward speeds and two reverse speeds by combining three simple planetary gear sets with four clutches and two brakes.

In an aspect of the present invention, the gear train of an automatic transmission for vehicles, may include a first planetary gear set having a first sun gear, a first planet carrier, and a first ring gear as rotation elements thereof, a second planetary gear set having a second sun gear, a second planet carrier, and a second ring gear as rotation elements thereof, a third planetary gear set having a third sun gear, a third planet carrier, and a first ring gear as rotation elements thereof, and frictional elements provided with a plurality of clutches connecting at least a rotation element of the first, second, and third planetary gear sets to another rotation element thereof or an input shaft, and a plurality of brakes connecting at least a rotation element to a transmission housing, wherein the first planetary gear set has a first rotation element always operated as a fixed element, a second rotation element forming a first intermediate output path through which a reduced rotational speed may be output, and a third rotation element forming an input path connected to an input shaft and forming a second intermediate output path through which a rotational speed of the input shaft may be output, wherein a rotation element of the second planetary gear set may be fixedly connected to a rotation element of the third planetary gear set and another rotation element of the second planetary gear set may be selectively connected to another rotation element of the third planetary gear set such that the second and third planetary gear set operate as a compound planetary gear set having four rotation elements, and wherein the four rotation elements includes a fourth rotation element forming a first variable input path selectively connected to the first or second intermediate output paths and selectively connected to the transmission housing so as to be operated as a selective fixed element, a fifth rotation element forming a second variable input path selectively connected to the input shaft or selectively connected to the transmission housing so as to be operated as a selective fixed element, a sixth rotation element connected to an output gear and forming a final output path, and a seventh rotation element forming an intermediate input path fixedly connected to the first intermediate output path.

The first planetary gear set may be a double pinion planetary gear set, the second planetary gear set may be a double pinion planetary gear set, and the third planetary gear set may be a single pinion planetary gear set.

The first sun gear may be operated as the first rotation element, the first ring gear may be operated as the second rotation element, the first planet carrier may be operated as the third rotation element, the second sun gear may be operated as the fourth rotation element, the second and third ring gears may be operated as the fifth rotation element, the second and third planet carriers may be operated as the sixth rotation element, and the third sun gear may be operated as the seventh rotation element.

The frictional elements may include a first clutch disposed between the second and third planet carriers forming the sixth rotation element, a second clutch disposed between the second rotation element and the fourth rotation element, a third clutch disposed between the third rotation element and the fourth rotation element, a fourth clutch disposed between the input shaft and the fifth rotation element, a first brake disposed between the fifth rotation element and transmission housing, and a second brake disposed between the fourth rotation element and the transmission housing.

The frictional elements may further include a one-way clutch disposed in parallel with the first brake.

The first clutch and the one-way clutch may be operated at a first forward speed, the first clutch and the second brake may be operated at a second forward speed, the first and second clutches may be operated at a third forward speed, the first and third clutches may be operated at a fourth forward speed, the first and fourth clutches may be operated at a fifth forward speed, the third and fourth clutches may be operated at a sixth forward speed, the second and fourth clutches may be operated at a seventh forward speed, the fourth clutch and the second brake may be operated at an eighth forward speed, the second clutch and the first brake may be operated at a first reverse speed, and the third clutch and the first brake may be operated at a second reverse speed.

The second and third clutches and the second brake may be disposed in front of the first planetary gear set, the first clutch may be disposed between the second and third planetary gear sets, and the first brake and the fourth clutch may be disposed at the back of the third planetary gear set.

In another aspect of the present invention, the first planetary gear set may be a double pinion planetary gear set, the second planetary gear set may be a single pinion planetary gear set, and the third planetary gear set may be a double pinion planetary gear set.

The first sun gear may be operated as the first rotation element, the first ring gear may be operated as the second rotation element, the first planet carrier may be operated as the third rotation element, the second sun gear may be operated as the fourth rotation element, the second and third planet carriers may be operated as the fifth rotation element, the second and third ring gears may be operated as the sixth rotation element, and the third sun gear may be operated as the seventh rotation element.

The frictional elements may include a first clutch disposed between the second and third ring gears forming the sixth rotation element, a second clutch disposed between the second rotation element and the fourth rotation element, a third clutch disposed between the third rotation element and the fourth rotation element, a fourth clutch disposed between the input shaft and the fifth rotation element, a first brake disposed between the fifth rotation element and the transmission housing, and a second brake disposed between the fourth rotation element and the transmission housing.

The frictional elements may further include a one-way clutch disposed in parallel with the first brake.

The second and third clutches and the second brake may be disposed in front of the first planetary gear set, the first brake may be disposed between the first and second planetary gear sets, the first clutch may be disposed between the second and third planetary gear sets, and the fourth clutch may be disposed at the back of the third planetary gear set.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart for a gear train according to the first exemplary embodiment of the present invention.

Figure 1:
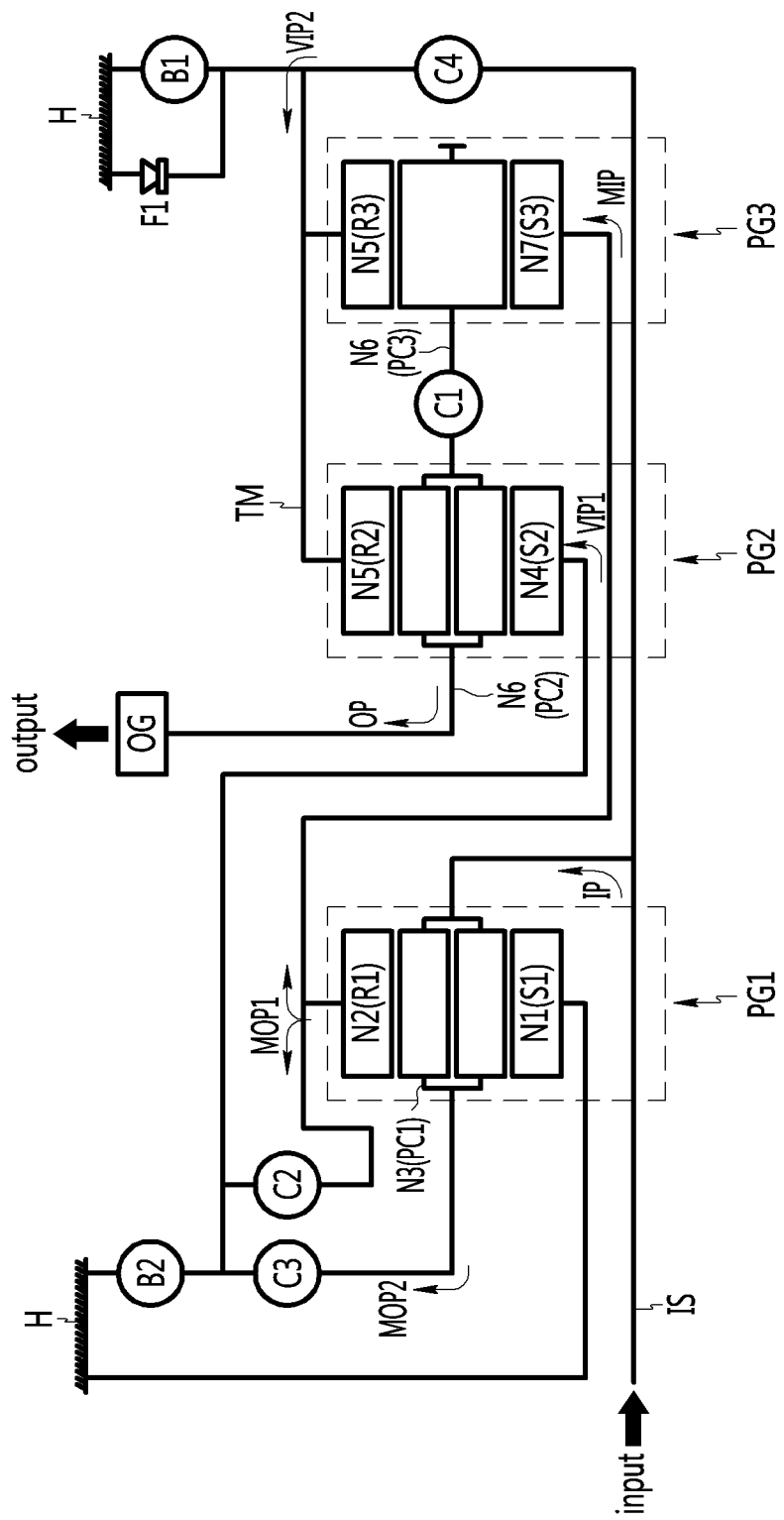
FIG. 1 is a schematic diagram of a gear train according to the first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a gear train according to the first exemplary embodiment of the present invention. A gear train according to the first exemplary embodiment of the present invention includes first, second, and third planetary gear sets PG1, PG2, and PG3 disposed on the same axis, clutch means including four clutches C1, C2, C3, and C4, and brake means including two brakes B1 and B2.

Accordingly, a rotational speed input from an input shaft IS is changed by the first, second, and third planetary gear sets PG1, PG2, and PG3 and is output through an output gear OG. The first planetary gear set PG1 is disposed close to an engine, and the second and third planetary gear sets PG2 and PG3 are sequentially disposed at the back of the first planetary gear set PG1.

The input shaft IS is an input member and denotes a turbine shaft of a torque converter. Torque transmitted from a crankshaft of the engine is converted by the torque converter and is input to the gear train through the input shaft IS. The output gear OG is an output member and is connected to a well-known differential apparatus (not shown) so as to transmit an output of the gear train to driving wheels.

The first planetary gear set PG1 is a double pinion planetary gear set, and has three rotation elements including a sun gear, a planet carrier, and a ring gear. For better comprehension and ease of description, the sun gear is indicated by a first sun gear S1, the planet carrier is indicated by a first planet carrier PC1, and the ring gear is indicated by a first ring gear R1.

In the first planetary gear set PG1, the first sun gear S1 is fixedly connected to a transmission housing H, and the first planet carrier PC1 is fixedly connected to the input shaft IS.

In more concrete, the first sun gear S1 is operated as a first rotation element N1 and is fixedly connected to the transmission housing H so as to be always operated as a fixed element, the first ring gear R1 is operated as a second rotation element N2 and forms a first intermediate output path MOP1 so as to be operated as an output element through which a reduced rotational speed output is always output, and the first planet carrier PC1 is operated as a third rotation element N3. The first planet carrier PC1 is fixedly connected to the input shaft IS so as to form an input path IP and forms a second intermediate output path MOP2 through which the rotational speed of the input shaft IS is output.

The second planetary gear set PG2 is a double pinion planetary gear set, and has three operational elements including a sun gear, a planet carrier, and a ring gear. For better comprehension and ease of description, the sun gear is indicated by a second sun gear S2, the planet carrier is indicated by a second planet carrier PC2, and the ring gear is indicated by a second ring gear R2.

In addition, the third planetary gear set PG3 is a single pinion planetary gear set, and has three operational elements including a sun gear, a planet carrier, and a ring gear. For better comprehension and ease of description, the sun gear is indicated by a third sun gear S3, the planet carrier is indicated by a third planet carrier PC3, and the ring gear is indicated by a third ring gear R3.

In the second and third planetary gear sets PG2 and PG3, the second ring gear R2 is fixedly connected to the third ring gear R3, and the second and third planet carriers PC2 and PC3 are selectively connected to each other such that the second and third planetary gear sets PG2 and PG3 are operated as one compound planetary gear set and have four rotation elements.

Accordingly, the second sun gear S2 is operated as a fourth rotation element N4, forms a first variable input path VIP1 selectively connected to the first intermediate output path MOP1 and the second intermediate output path MOP2, and is selectively connected to the transmission housing H so as to be operated as a selective fixed element.

The second and third ring gears R2 and R3 are operated as a fifth rotation element N5, form a second variable input path VIP2 selectively connected to the input shaft IS, and is selectively connected to the transmission housing H so as to be operated as a selective fixed element.

The second planet carrier PC2 or the second planet carrier PC2 and the third planet carrier PC3 connected to each other when a first clutch C1 is operated is operated as a sixth rotation element N6 and is connected to the output gear OG so as to form a final output path OP.

The third sun gear S3 is operated as a seventh rotation element N7 and forms an intermediate input path MIP fixedly connected to the first intermediate output path MOP1.

The first clutch C1 is disposed between the second and third planet carriers PC2 and PC3, a second clutch C2 is disposed between the second rotation element N2 and the fourth rotation element N4, a third clutch C3 is disposed between the third rotation element N3 and the fourth rotation element N4, and the fourth clutch C4 is disposed between the input shaft IS and the fifth rotation element N5.

A first brake B1 that is disposed in parallel with a one-way clutch F1 is disposed between the fifth rotation element N5 and the transmission housing H, and a second brake B2 is disposed between the fourth rotation element N4 and the transmission housing H.

When disposing the friction elements in the automatic transmission, the second and third clutches C2 and C3 and the second brake B2 are disposed in front of the first planetary gear set PG1, the first clutch C1 is disposed between the second and third planetary gear sets PG2 and PG3, and the one-way clutch F1, the first brake B1, and the fourth clutch C4 are disposed at the back of the third planetary gear set PG3.

If the friction elements are dispersed as described above, formation of hydraulic lines for supplying hydraulic pressure to such friction elements may be simplified, and weight balance in the automatic transmission may be enhanced.

Figure 3:
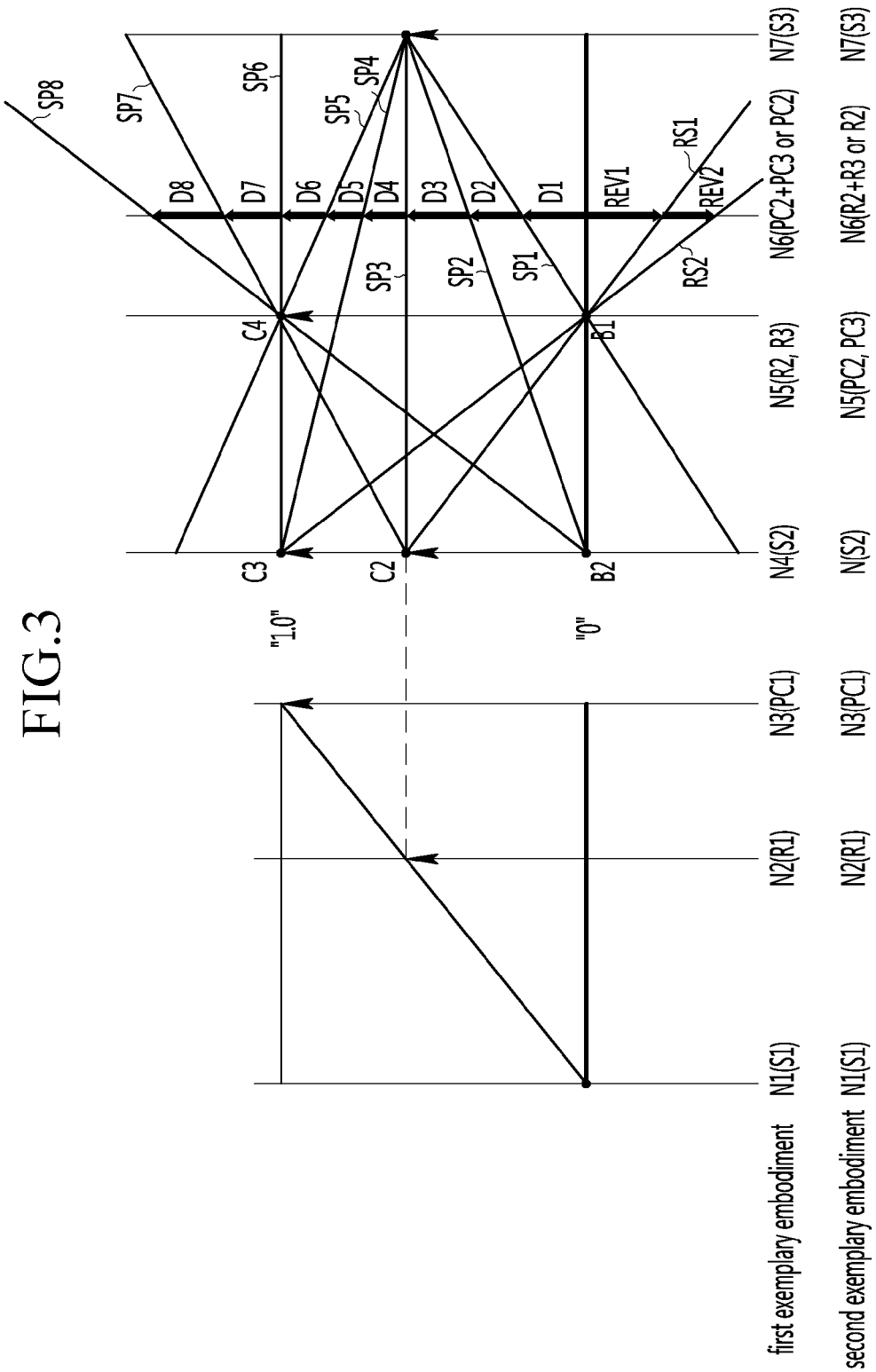
FIG. 3 is a lever diagram for a gear train according to the first and second exemplary embodiments of the present invention.

FIG. 2 is an operational chart for a gear train according to exemplary embodiments of the present invention. That is, FIG. 3 shows which clutches and brakes are operated at each shift-speed. As shown in FIG. 2, two friction elements are operated at each shift-speed according to exemplary embodiments of the present invention.

That is, the first clutch C1 and the one-way clutch F1 are operated at a first forward speed D1, the first clutch C1 and the second brake B2 are operated at a second forward speed D2, the first and second clutches C1 and C2 are operated at a third forward speed D3, the first and third clutches C1 and C3 are operated at a fourth forward speed D4, the first and fourth clutches C1 and C4 are operated at a fifth forward speed D5, the third and fourth clutches C3 and C4 are operated at a sixth forward speed D6, the second and fourth clutches C2 and C4 are operated at a seventh forward speed D7, the fourth clutch C4 and the second brake B2 are operated at an eighth forward speed D8, the second clutch C2 and the first brake B1 are operated at a first reverse speed REV1, and the third clutch C3 and the first brake B1 are operated at a second reverse speeds REV2.

FIG. 3 is a lever diagram for a gear train according to the first and second exemplary embodiments of the present invention. In the drawings, a lower horizontal line represents a rotational speed is "0", and an upper horizontal line represents a rotational speed is "1.0", that is, the rotational speed thereof is the same as that of the input shaft IS.

Three vertical lines of the first planetary gear set PG1 sequentially represent the first sun gear S1 of the first rotation element N1, the first ring gear R1 of the second rotation element N2, and the first planet carrier PC1 of the third rotation element N3 from the left to the right, and distances therebetween are set according to a gear ratio (teeth number of the sun gear/teeth number of the ring gear) of the first planetary gear set PG1.

Four vertical lines of the second and third planetary gear sets PG2 and PG3 sequentially represent the second sun gear S2 of the fourth rotation element N4, the second and third ring gears R2 and R3 of the fifth rotation element N5, the second planet carrier PC2 or the second and third planet carriers PC2 and PC3 of the sixth rotation element N6, and the third sun gear S3 of the seventh rotation element N7 from the left to the right, and distances therebetween are set according to gear ratios (teeth number of the sun gear/teeth number of the ring gear) of the second and third planetary gear sets PG2 and PG3.

Position of each rotation element in the lever diagram is well known to a person of an ordinary skill in the art who designs a gear train, and thus detailed description will be omitted.

[First Forward Speed]

At the first forward speed D1, the first clutch C1 and the one-way clutch F1 are operated, as shown in FIG. 2.

In a state that the rotational speed of the input shaft IS is input to the third rotation element N3 forming the input path IP, the first rotation element N1 is operated as a fixed element such that the reduced rotational speed is output through the second rotation element N2 forming the first intermediate output path MOP1.

The reduced rotational speed of the first intermediate output path MOP1 is transmitted to the third planetary gear set PG3 through the seventh rotation element N7 forming the intermediate input path MIP, and the second and third planet carriers PC2 and PC3 are connected to each other so as to form the sixth rotation element N6 by an operation of the first clutch C1.

In a state that the reduced rotational speed is input to the seventh rotation element N7, the fifth rotation element N5 is operated as a fixed element by an operation of the one-way clutch F1. Therefore, the rotation elements of the second and third planetary gear sets PG2 and PG3 form a first shift line SP1, and the first forward speed D1 is output through the sixth rotation element N6 that is the output element.

[Second Forward Speed]

At the second forward speed D2, the one-way clutch F1 that was operated at the first forward speed D1 is released and the second brake B2 is operated.

In a state that the reduced rotational speed of the first intermediate output path MOP1 is input to the seventh rotation element N7 such as at the first forward speed D1, the fourth rotation element N4 is operated as a fixed element by an operation of the second brake B2. Therefore, the rotation elements of the second and third planetary gear sets PG2 and PG3 form a second shift line SP2, and the second forward speed D2 is output through the sixth rotation element N6 that is the output element.

[Third Forward Speed]

At the third forward speed D3, the second brake B2 that was operated at the second forward speed D2 is released and the second clutch C2 is operated.

In a state that the reduced rotational speed of the first intermediate output path MOP1 is input to the seventh rotation element N7 such as at the second forward speed D2, the reduced rotational speed of the first intermediate output path MOP1 is input to the fourth rotation element N4 by an operation of the second clutch C2. Therefore, the second and third planetary gear sets PG2 and PG3 become direct-coupling states and the rotation elements of the second and third planetary gear sets PG2 and PG3 form a third shift line SP3. Accordingly, the third forward speed D3 is output through the sixth rotation element N6 that is the output element.

[Fourth Forward Speed]

At the fourth forward speed D4, the second clutch C2 that was operated at the third forward speed D3 is released and the third clutch C3 is operated.

In a state that the reduced rotational speed of the first intermediate output path MOP1 is input to the seventh rotation element N7 such as at the third forward speed D3, the rotational speed of the third rotation element N3 (the same as the rotational speed of the input shaft IS) is input to the fourth rotation element N4 by an operation of the third clutch C3. Therefore, the rotation elements of the second and third planetary gear sets PG2 and PG3 form a fourth shift line SP4, and the fourth forward speed D4 is output through the sixth rotation element N6 that is the output element.

[Fifth Forward Speed]

At the fifth forward speed D5, the third clutch C3 that was operated at the fourth forward speed D4 is released and the fourth clutch C4 is operated.

In a state that the reduced rotational speed of the first intermediate output path MOP1 is input to the seventh rotation element N7 such as at the fourth forward speed D4, the rotational speed of the input shaft IS is input to the fifth rotation element N5 by an operation of the fourth clutch C4. Therefore, the rotation elements of the second and third planetary gear sets PG2 and PG3 form a fifth shift line SP5, and the fifth forward speed D5 is output through the sixth rotation element N6 that is the output element.

[Sixth Forward Speed]

At the sixth forward speed D6, the first clutch C1 that was operated at the fifth forward speed D5 is released and the third clutch C3 is operated.

Since the rotational speed of the input shaft IS is respectively input to the fourth and fifth rotation elements N4 and N5 by the operations of the third and fourth clutches C3 and C4, the second and third planetary gear sets PG2 and PG3 become the direct-coupling states. Therefore, the rotation elements of the second and third planetary gear sets PG2 and PG3 form a sixth shift line SP6, and the sixth forward speed D6 is output through the sixth rotation element N6 that is the output element.

At this time, since the rotational speed of the second rotation element N2 is always input to the seventh rotation element N7, the first clutch C1 is released such that the rotational speed of the seventh rotation element N7 does not affect the shift process.

[Seventh Forward Speed]

At the seventh forward speed D7, the third clutch C3 that was operated at the sixth forward speed D6 is released and the second clutch C2 is operated.

In a state that the rotational speed of the input shaft IS is input to the fifth rotation element N5 by the operation of the fourth clutch C4, the rotational speed of the second rotation element N2 is input to the fourth rotation element N4 by the operation of the second clutch C2. Therefore, the rotation elements of the second and third planetary gear sets PG2 and PG3 form a seventh shift line SP7, and the seventh forward speed D7 is output through the sixth rotation element N6 that is the output element.

[Eighth Forward Speed]

At the eighth forward speed D8, the second clutch C2 that was operated at the seventh forward speed D7 is released and the second brake B2 is operated.

In a state that the rotational speed of the input shaft IS is input to the fifth rotation element N5 such as at the seventh forward speed D7, the fourth rotation element N4 is operated as a fixed element by the operation of the second brake B2. Therefore, the rotation elements of the second and third planetary gear sets PG2 and PG3 form an eighth shift line SP8, and the eighth forward speed D8 is output through the sixth rotation element N6 that is the output element.

[First Reverse Speed]

At the first reverse speed REV1, the second clutch C2 and the first brake B1 are operated, as shown in FIG. 2.

In a state that the rotational speed of the second rotation element N2 is input to the fourth rotation element N4 by the operation of the second clutch C2, the fifth rotation element N5 is operated as a fixed element by the operation of the first brake B2. Therefore, the rotation elements of the second and third planetary gear sets PG2 and PG3 form a first reverse shift line RS1, and the first reverse speed REV1 is output through the sixth rotation element N6 that is the output element.

[Second Reverse Speed]

At the second reverse speed REV2, the second clutch C2 that was operated at the first reverse speed REV1 is released and the third clutch C3 is operated.

In a state that the fifth rotation element N5 is operated as a fixed element such as at the first reverse speed REV1, the rotational speed of the input shaft IS is input to the fourth rotation element N4 by the operation of the third clutch C3. Therefore, the rotation elements of the second and third planetary gear sets PG2 and PG3 form a second reverse shift line RS2, and the second reverse speed REV2 is output through the sixth rotation element N6 that is the output element.

Figure 4:
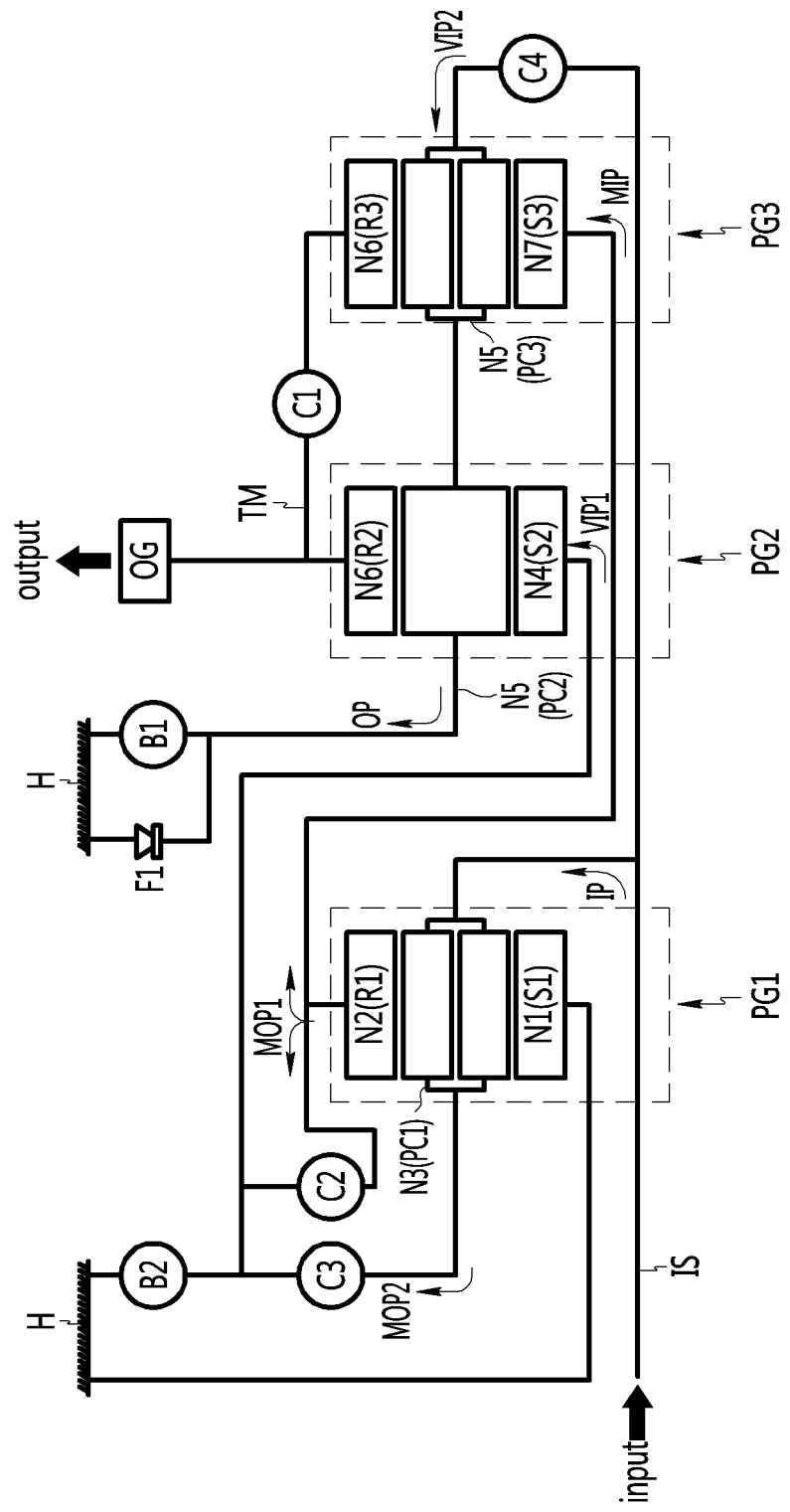
FIG. 4 is a schematic diagram of a gear train according to the second exemplary embodiment of the present invention.

FIG. 4 is a schematic diagram of a gear train according to the second exemplary embodiment of the present invention. The second planetary gear set PG2 is the double pinion planetary gear set and the third planetary gear set PG3 is the single pinion planetary gear set according to the first exemplary embodiment, but the second planetary gear set PG2 is a single pinion planetary gear set and the third planetary gear set PG3 is a double pinion planetary gear set according to the second exemplary embodiment.

Accordingly, the second sun gear S2 is operated as the fourth rotation element N4, the second and third planet carriers PC2 and PC3 are operated as the fifth rotation element N5, the second and third ring gears R2 and R3 are operated as the sixth rotation element N6, and the third sun gear S3 is operated as the seventh rotation element N7 in the second and third planetary gear sets PG2 and PG3.

If the second exemplary embodiment of the present invention is compared with the first exemplary embodiment, constituent elements forming the fifth and sixth rotation elements N5 and N6 are changed, but shift processes of the second exemplary embodiment is the same as those of the first exemplary embodiment. Thus, detailed description thereof will be omitted.

As described above, eight forward speeds and two reverse speeds are achieved by combining three simple planetary gear sets with four clutches and two brakes. Therefore, power delivery performance and fuel economy may be improved, and particularly, performance in reverse speeds may be improved.

Since the frictional elements are dispersedly disposed, formation of hydraulic lines may be simplified, weight balance in an automatic transmission may be enhanced.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for vehicles, comprising:
    a first planetary gear set having a first sun gear, a first planet carrier, and a first ring gear as rotation elements of the first planetary gear set;
    a second planetary gear set having a second sun gear, a second planet carrier, and a second ring gear as rotation elements of the second planetary gear set;
    a third planetary gear set having a third sun gear, a third planet carrier, and a third ring gear as rotation elements of the third planetary gear set; and
    frictional elements including a plurality of clutches and a plurality of brakes, each of the plurality of clutches connecting at least a rotation element of the first, second, and third planetary gear sets to another rotation element of the first, second, and third planetary gear sets or to an input shaft, and each of the plurality of brakes connecting at least a rotation element of the first, second, and third planetary gear sets to a transmission housing,
    wherein the rotation elements of the first planetary gear set are operated as first, second and third rotation elements of the gear train, with the first rotation element always operated as a fixed element, the second rotation element forming a first intermediate output path through which a reduced rotational speed is output, the third rotation element connected to an input shaft thereby forming an input path and the third rotation element forming a second intermediate output path through which a rotational speed of the input shaft is output,
    wherein a rotation element in the rotation elements of the second planetary gear set is fixedly connected to a rotation element in the rotation elements of the third planetary gear set and another rotation element in the rotation elements of the second planetary gear set is selectively connected to another rotation element in the rotation elements of the third planetary gear set such that the second and third planetary gear sets operate as a compound planetary gear set having four rotation elements, and
    wherein the four rotation elements of the operating compound planetary gear set are operated as fourth, fifth, sixth and seventh rotation elements of the gear train, with the fourth rotation element selectively connected to the first or second intermediate output paths and selectively connected to the transmission housing thereby forming a first variable input path so as to be operated as a selective fixed element, the fifth rotation element selectively connected to the input shaft or selectively connected to the transmission housing thereby forming a second variable input path so as to be operated as a selective fixed element, the sixth rotation element connected to an output gear and forming a final output path, and the seventh rotation element fixedly connected to the first intermediate output path thereby forming an intermediate input path,
    wherein each of the first, second and third planetary gear sets is a simple planetary gear set including one sun gear, one planet carrier and one ring gear.

2. The gear train of claim 1, wherein the first planetary gear set is a double pinion planetary gear set, the second planetary gear set is a double pinion planetary gear set, and the third planetary gear set is a single pinion planetary gear set.

3. The gear train of claim 2, wherein the first sun gear is operated as the first rotation element of the gear train, the first ring gear is operated as the second rotation element of the gear train, the first planet carrier is operated as the third rotation element of the gear train, the second sun gear is operated as the fourth rotation element of the gear train, the second and third ring gears are operated as the fifth rotation element of the gear train, the second and third planet carriers are operated as the sixth rotation element of the gear train, and the third sun gear is operated as the seventh rotation element of the gear train.

4. The gear train of claim 3, wherein the plurality of clutches comprises:
    a first clutch disposed between the second and third planet carriers forming the sixth rotation element;
    a second clutch disposed between the second rotation element and the fourth rotation element;
    a third clutch disposed between the third rotation element and the fourth rotation element; and a fourth clutch disposed between the input shaft and the fifth rotation element; and the plurality of brakes comprises:

a first brake disposed between the fifth rotation element and the transmission housing; and a second brake disposed between the fourth rotation element and the transmission housing.

5. The gear train of claim 4, wherein the frictional elements further comprise a one-way clutch disposed in parallel with the first brake.

6. The gear train of claim 5, wherein the first clutch and the one-way clutch are operated at a first forward speed, the first clutch and the second brake are operated at a second forward speed, the first and second clutches are operated at a third forward speed, the first and third clutches are operated at a fourth forward speed, the first and fourth clutches are operated at a fifth forward speed, the third and fourth clutches are operated at a sixth forward speed, the second and fourth clutches are operated at a seventh forward speed, the fourth clutch and the second brake are operated at an eighth forward speed, the second clutch and the first brake are operated at a first reverse speed, and the third clutch and the first brake are operated at a second reverse speed.

7. The gear train of claim 4, wherein the second and third clutches and the second brake are disposed in front of the first planetary gear set, the first clutch is disposed between the second and third planetary gear sets, and the first brake and the fourth clutch are disposed at the back of the third planetary gear set.

8. The gear train of claim 1, wherein the first planetary gear set is a double pinion planetary gear set, the second planetary gear set is a single pinion planetary gear set, and the third planetary gear set is a double pinion planetary gear set.

9. The gear train of claim 8, wherein the first sun gear is operated as the first rotation element of the gear train, the first ring gear is operated as the second rotation element of the gear train, the first planet carrier is operated as the third rotation element of the gear train, the second sun gear is operated as the fourth rotation element of the gear train, the second and third planet carriers are operated as the fifth rotation element of the gear train, the second and third ring gears are operated as the sixth rotation element of the gear train, and the third sun gear is operated as the seventh rotation element of the gear train.

10. The gear train of claim 9, wherein the plurality of clutches comprises:

a first clutch disposed between the second and third ring gears forming the sixth rotation element;

a second clutch disposed between the second rotation element and the fourth rotation element;

a third clutch disposed between the third rotation element and the fourth rotation element; and a fourth clutch disposed between the input shaft and the fifth rotation element; and the plurality of brakes comprises:

a first brake disposed between the fifth rotation element and the transmission housing; and a second brake disposed between the fourth rotation element and the transmission housing.

11. The gear train of claim 10, wherein the frictional elements further comprise a one-way clutch disposed in parallel with the first brake.

12. The gear train of claim 10, wherein the second and third clutches and the second brake are disposed in front of the first planetary gear set, the first brake is disposed between the first and second planetary gear sets, the first clutch is disposed between the second and third planetary gear sets, and the fourth clutch is disposed at the back of the third planetary gear set.

13. A gear train of an automatic transmission for vehicles comprising:

a first planetary gear set being a double pinion planetary gear set and having a first sun gear, a first planet carrier, and a first ring gear as rotation elements of the first planetary gear set;

a second planetary gear set being a double pinion planetary gear set and having a second sun gear, a second planet carrier, and a second ring gear as rotation elements of the second planetary gear set; and a third planetary gear set being a single pinion planetary gear set and having a third sun gear, a third planet carrier, and a third ring gear as rotation elements of the third planetary gear set, four clutches including first, second, third, and fourth clutches, and two brakes including first and second brakes, wherein the first planet carrier is fixedly connected to an input shaft, the first ring gear is fixedly connected to the third sun gear, the second and third ring gears are fixedly connected to each other, the first sun gear is fixedly connected to a transmission housing, and the second planet carrier is fixedly connected to an output gear, and wherein the first clutch selectively connects the second planet carrier to the third planet carrier, the second clutch selectively connects the first ring gear to the second sun gear, the third clutch selectively connects the first planet carrier to the second sun gear, the fourth clutch selectively connects the input shaft to the third ring gear, the first brake selectively connects the third ring gear to the transmission housing, and the second brake selectively connects the second sun gear to the transmission housing.

14. The gear train of claim 13, wherein the second and third clutches and the second brake are disposed in front of the first planetary gear set, the first clutch is disposed between the second and third planetary gear sets, and the first brake and the fourth clutch are disposed at the back of the third planetary gear set.

15. A gear train of an automatic transmission for vehicles comprising:

a first planetary gear set being a double pinion planetary gear set and having a first sun gear, a first planet carrier, and a first ring gear as rotation elements of the first planetary gear set;

a second planetary gear set being a single pinion planetary gear set and having a second sun gear, a second planet carrier, and a second ring gear as rotation elements of the second planetary gear set; and a third planetary gear set being a double pinion planetary gear set and having a third sun gear, a third planet carrier, and a third ring gear as rotation elements of the third planetary gear set, four clutches including first, second, third, and fourth clutches, and two brakes including first and second brakes, wherein the first planet carrier is fixedly connected to an input shaft, the first ring gear is fixedly connected to the third sun gear, the second and third planet carriers are fixedly connected to each other, the first sun gear is fixedly connected to a transmission housing, and the second ring gear is fixedly connected to an output gear, and wherein the first clutch selectively connects the second ring gear to the third ring gear, the second clutch selectively connects the first ring gear to the second sun gear, the third clutch selectively connects the first planet carrier to the second sun gear, the fourth clutch selectively connects the input shaft to the third planet carrier, the first brake selectively connects the second planet carrier to the transmission housing, and the second brake selectively connects the second sun gear to the transmission housing.

16. The gear train of claim 15, wherein the second and third clutches and the second brake are disposed in front of the first planetary gear set, the first brake is disposed between the first and second planetary gear sets, the first clutch is disposed between the second and third planetary gear sets, and the fourth clutch is disposed at the back of the third planetary gear set.

* * * * *